US008645987B2

(12) United States Patent
Rowland

(10) Patent No.: US 8,645,987 B2
(45) Date of Patent: Feb. 4, 2014

(54) ADVERTISEMENT AIRING AUDIT SYSTEM AND ASSOCIATED METHODS

(75) Inventor: Richard Rowland, St. Augustine, FL (US)

(73) Assignee: Power-Link Software Systems, Inc., St. Augustine, FL (US)

( * ) Notice: Subject to any disclaimer, the term of this patent is extended or adjusted under 35 U.S.C. 154(b) by 444 days.

(21) Appl. No.: 12/099,467

(22) Filed: Apr. 8, 2008

(65) Prior Publication Data

US 2008/0256568 A1 Oct. 16, 2008

Related U.S. Application Data

(60) Provisional application No. 60/911,614, filed on Apr. 13, 2007.

(51) Int. Cl.
*H04N 7/16* (2011.01)

(52) U.S. Cl.
USPC ................................ 725/22; 725/36; 709/229

(58) Field of Classification Search
USPC ......................... 725/32–36, 20; 709/217–232
See application file for complete search history.

(56) References Cited

U.S. PATENT DOCUMENTS

| | | | | |
|---|---|---|---|---|
| 5,621,454 | A * | 4/1997 | Ellis et al. | 725/22 |
| 6,177,931 | B1 * | 1/2001 | Alexander et al. | 725/52 |
| 2007/0039018 | A1 * | 2/2007 | Saslow et al. | 725/22 |
| 2008/0256568 | A1 * | 10/2008 | Rowland | 725/22 |

* cited by examiner

*Primary Examiner* — Annan Shang
(74) *Attorney, Agent, or Firm* — Allen, Dyer, Doppelt, Milbrath & Gilchrist, P.A.

(57) ABSTRACT

The system provides an Internet-based site accessible by customers and broadcasters for tracking the airing of their advertisements. The system includes a software package for creating a database of all events occurring on a broadcast station, which may comprise, for example, a radio or television station, although these are not intended as limitations. The software package receives a recording of a station's output, which contains metadata on each broadcast element that includes time, date, and content information. As the broadcast proceeds, the start and stop time of each element are stored in a table in the database. This database can then be subsequently queried via the website by a customer or media personnel to ascertain that the spot has aired as intended.

19 Claims, 4 Drawing Sheets

ADVERTISEMENT AIRING AUDIT SYSTEM AND ASSOCIATED METHODS

CROSS-REFERENCE TO RELATED APPLICATION

This application claims priority to provisional patent application Ser. No. 60/911,614, filed Apr. 13, 2007.

BACKGROUND OF THE INVENTION

1. Field of the Invention

The present invention relates to devices and methods for tracking broadcast media elements, and, more particularly, to such devices and methods for reconciling advertising elements within a broadcast.

2. Description of Related Art

Broadcast media advertising is typically purchased on the basis of the number of times an advertisement will air and the time of day at which it is intended to air. Additionally, network affiliates are provided with network-wide advertisements that are intended to air at certain predetermined times. Further, "live" spots can also be contracted for, wherein an announcer incorporates the spot into the program verbiage.

Until now, there has been no reliable way to ensure that advertisements are indeed airing as intended, which would be beneficial to the entity contracting for this service.

SUMMARY OF THE INVENTION

The present invention is directed to a system and method for auditing the actual appearances of advertisements. Herein the term "advertisement" is intended to be taken broadly as any non-program broadcast element. An advertisement may include, for example, a commercial spot, a community service announcement, a forward promotion, or sponsorship acknowledgment, for example, although these are not intended as limitations.

The system in a preferred embodiment comprises an Internet-based site accessible by customers and broadcasters for tracking the airing of their advertisements. The system further comprises a software package for creating a database of all events occurring on a broadcast station, which may comprise, for example, a radio or television station, although these are not intended as limitations.

In a particular embodiment, the software package receives a recording of a station's output, which contains metadata that can comprise time, date, and content information. For example, each element of the broadcast can have associated therewith an identifier code that can be mapped to an identity of the element. As the broadcast proceeds, the start and stop time of each element are stored in a table in the database. This database can then be subsequently queried via the website by a customer or media personnel to ascertain that the spot has aired as intended.

A method for determining an aired status of an element scheduled for broadcasting can comprise receiving a first set of data regarding a plurality of elements broadcast on a broadcast medium. The first data set can include a time at which each element was actually broadcast. A second set of data are received regarding an event that had been scheduled for broadcast on the broadcast medium at a predetermined scheduled time.

The first data set is scanned for the event. If the event is located in the first data set, the event's broadcast time is compared with the event's scheduled time. If the actual broadcast time is within a predetermined range from the event's scheduled time, an acceptable airing of the event is indicated. If the actual broadcast time is not within the predetermined range from the event's scheduled time, an error in the event's airing is indicated. If the event is not located in the first data set, an error in the event airing is indicated.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiments of the present invention will now be presented with reference to FIGS. 1-4.

The system 10 of the present invention comprises an audit tool for confirming airplay of broadcast elements. The system 10 comprises an encoder 11 for recording an actual broadcast of, for example, a radio or television station. The encoder 11 can comprise a tuner card in signal communication with a computer 12 and a software package adapted to perform data analysis functions.

Figure 1:
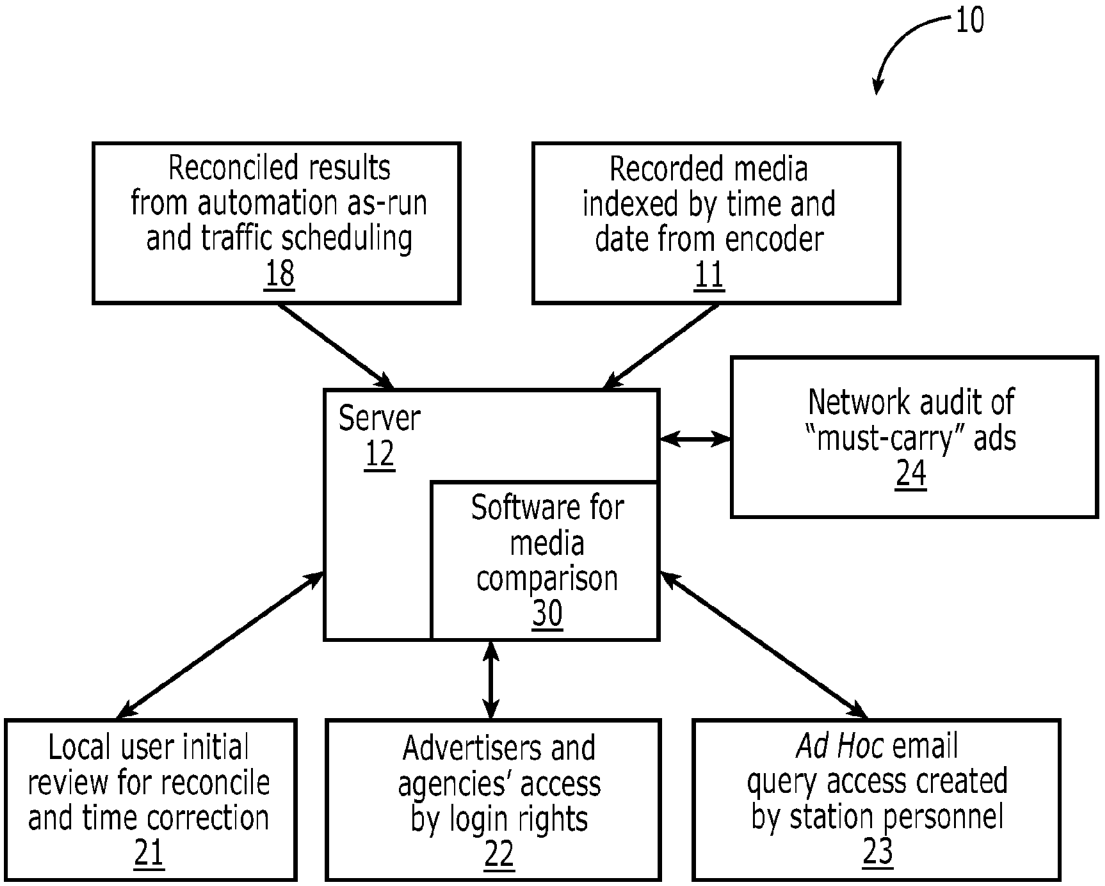
FIG. 1 is a schematic diagram of the interconnections of system elements.
Figure 2:
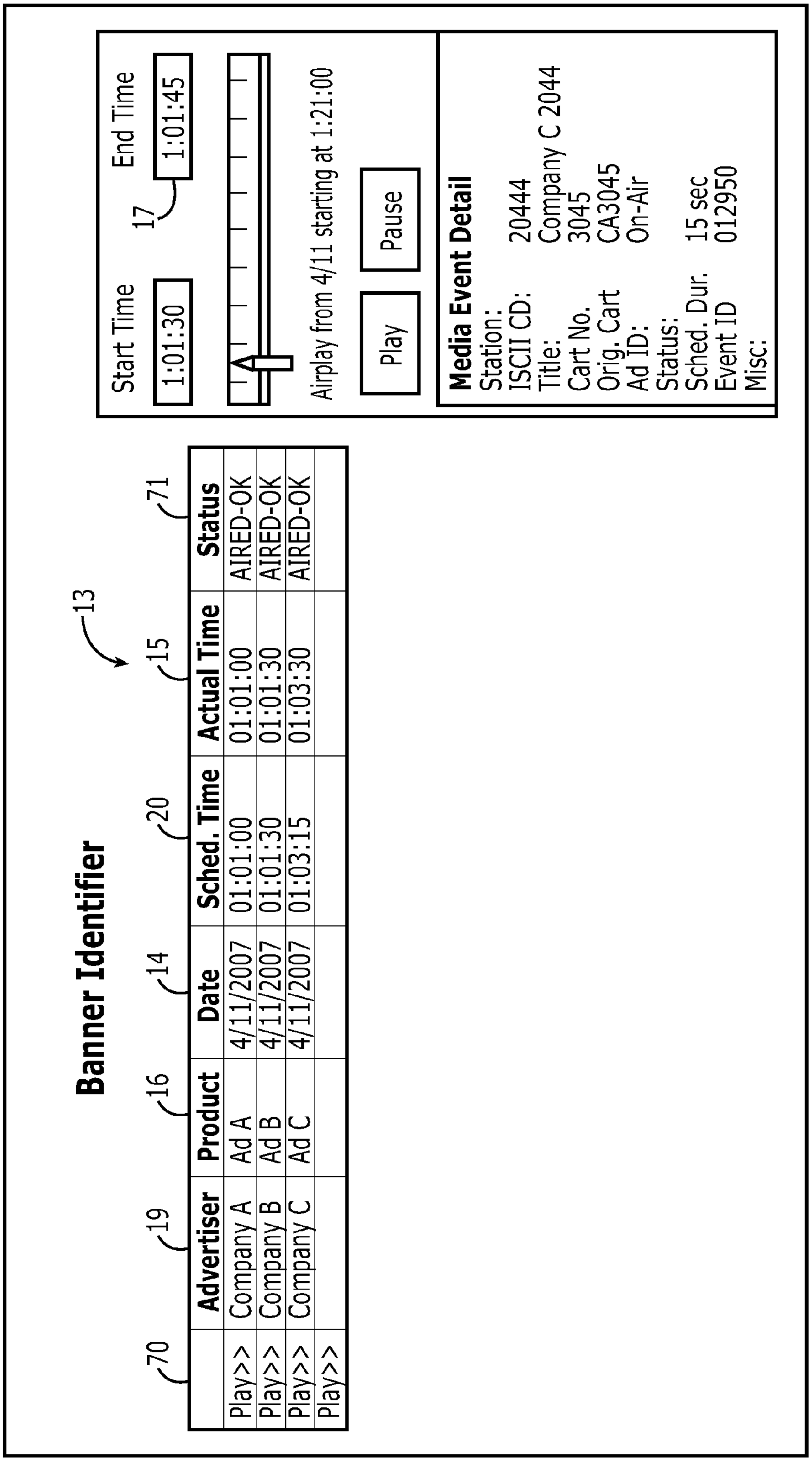
FIG. 2 is an exemplary portion of a media tracking table extracted from a database.
Figure 3:
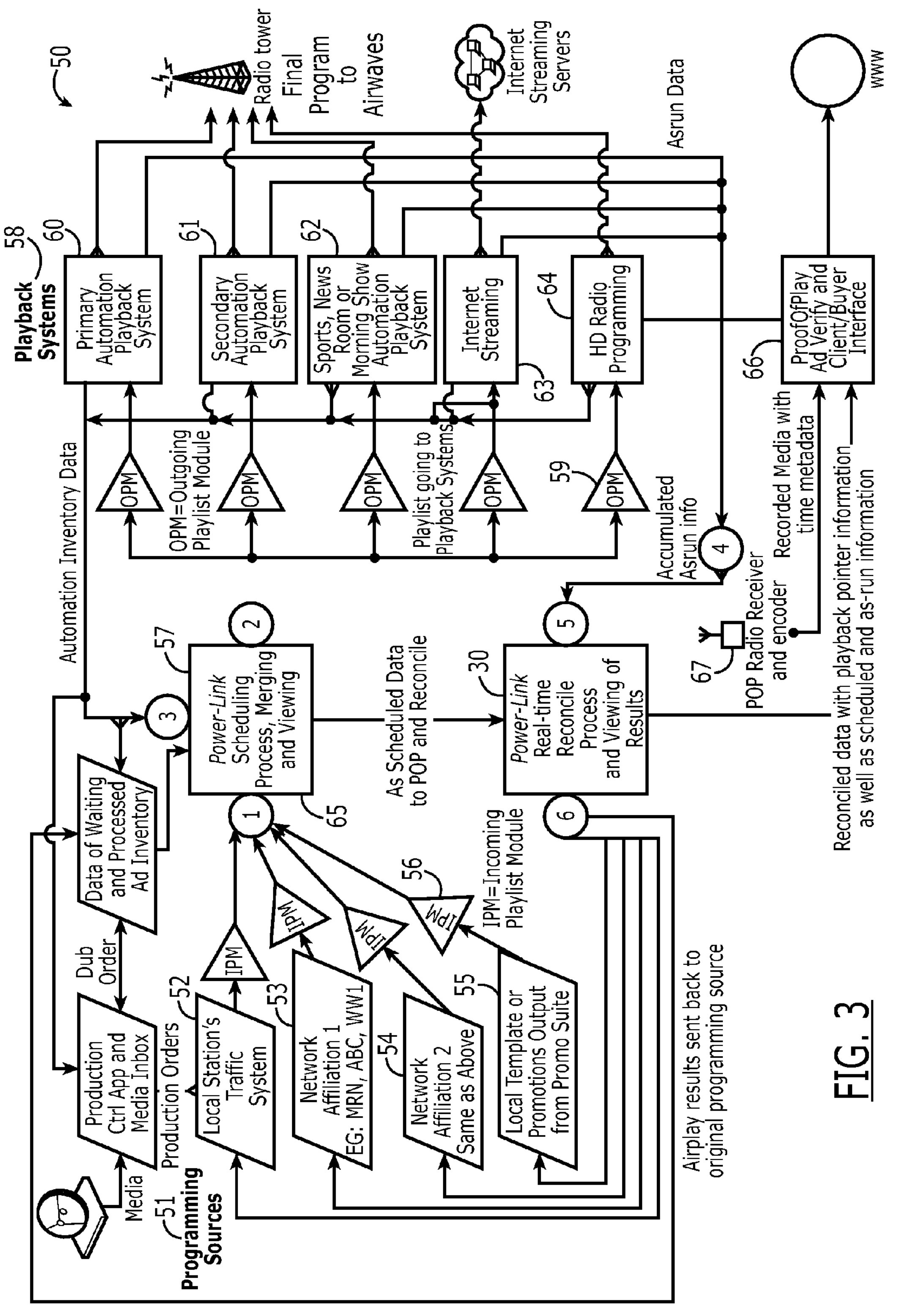
FIG. 3 is an exemplary diagram of data flow and functionality.
Figure 4:
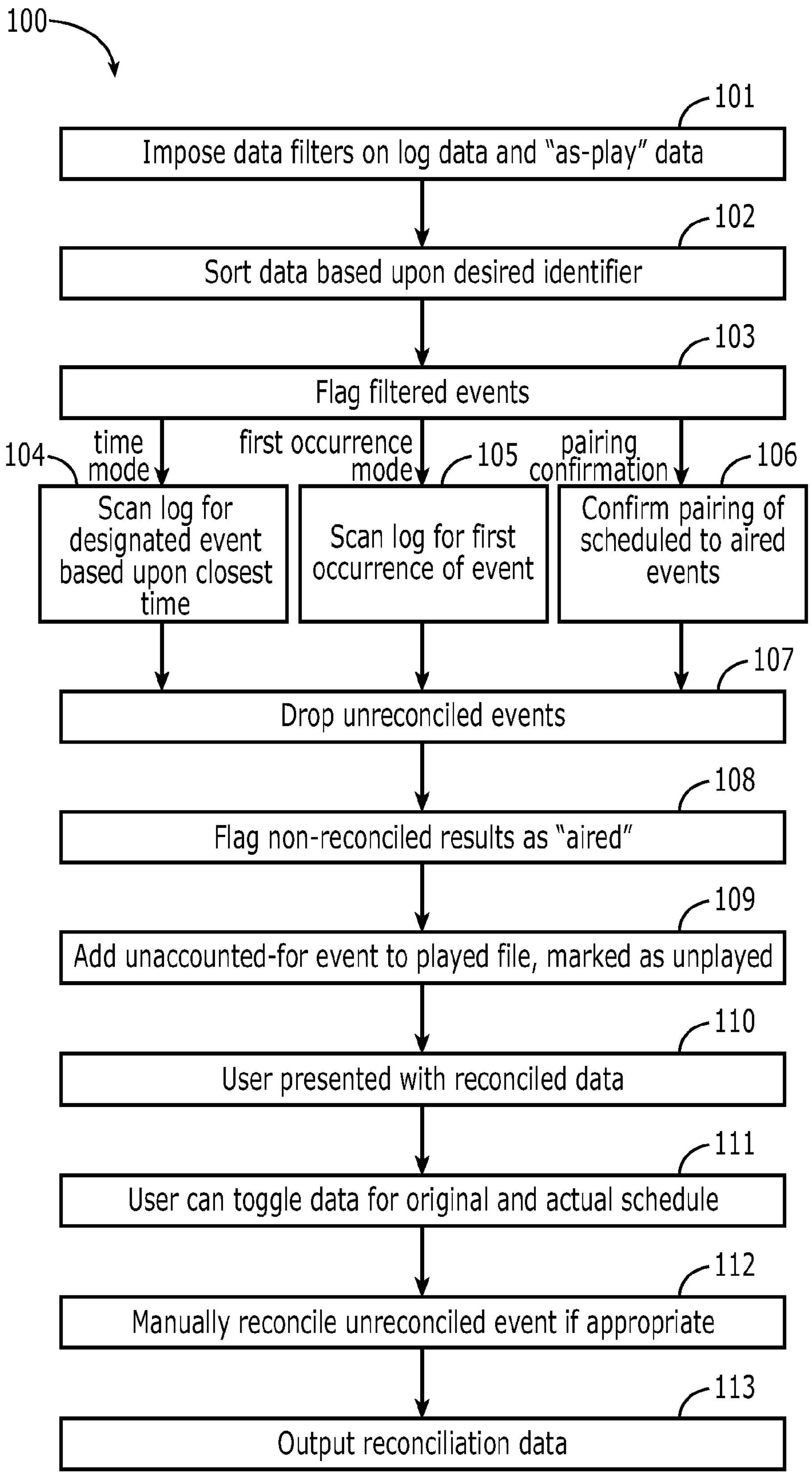
FIG. 4 is a flowchart of an exemplary embodiment of a method of operation of the system of the present invention.

In a preferred embodiment, the encoder 11 records a station's audio output in 65-min segments, with a 5-min overlap between the top of the hour and five minutes past the hour in order to avoid the possibility of missing data during segment shifts. The encoder 11 saves metadata associated with the broadcast in the database table. The metadata can include, for example, date, time, element identifier, duration of the element, and station signal strength. The encoder 11 also indexes the audio output for subsequent recall. FIG. 2 contains output from an exemplary table 13, showing date 14, start time 15, and sponsor identifier 19 ("advertiser"). The end time 17 can also be displayed for a highlighted element. This table output can comprise, for example, a computer screen, although this is not intended as a limitation, and other forms of data output can be contemplated by one of skill in the art, such as a printout.

The computer 12 also receives data from a system 18 within the station that produces schedule transfer and reconciliation data. This system 18 adds to the table the element name associated with the element identifier 16, the time 20 at which the element was originally scheduled to be aired, and the event status 71 (e.g., "aired"). This system 18 can also add, in certain embodiments, data on future scheduled events.

The system 18 also periodically submits reconciled data to the computer 12. These data provide time marks of where to "point to" in the media file when an element is requested for audit.

A user can request to review a broadcast element, and can receive both scheduled and as-run information. In one embodiment of the system 10, the reconciled data can be submitted on demand by the user; in another, the reconciled data are submitted automatically at predetermined intervals; in yet another, the reconciled data are submitted in "real time," that is, within an hour of having been played.

The user can request audit information based upon any of a plurality of criteria, including, but not intended to be limited to, advertiser, product, identifier code, date, time, duration, ISCI (Industry Standard Coding Identification), and Ad-ID values (Advertising Digital Identification).

Among the users can be station personnel 21 for performing daily reconciliation of commercial airplay, for example. These users are able to check discrepancies from the reconciliation step. Instant access is provided to the aired media, and data retrieved from any time desired. The user can then scan across time, seeing a read-out of the actual airtime, permitting a reconciliation of "live read" advertisements.

The system 10 also permits a realignment of the clocks in the encoder 11 and the reconciler 18, and performs a corresponding realignment of the data in the table. The user can also choose to parse out the commercial elements and save them in a binary large object record field. Additionally, if a live program has a built-in time delay, that can be reconciled as well.

The system 10 further permits the user to adjust the displayed table's layout and field sizes. Traffic data that can be provided can include, for example, advertiser, product, ISCI or AD-ID, duration, contract time range, schedule time, advertiser number, target program segment number, and competitive code of the product advertised.

Access can be granted to various classes of users. At the corporate or station management level 21, an administrative account permits the creation of "super-user" accounts for their employees, granting rights on functions they can perform. These super-users can create logins for their advertisers and agencies 22, and define what these advertiser and agencies can see upon entry. These created logins limit the advertisers to seeing only their commercials. An agency that has contracted for multiple buys from a plurality of advertisers may be granted dominion over those advertisers' elements.

Employee users are then permitted access to broadcast history, to create and send queries, and may be given selective access to create advertiser logins depending upon permission granted.

If an advertiser does not receive login privileges, an account representative can create an ad hoc query and email it to that advertiser 23. That client can then receive a link that produces the items of interest and the ability to play the associated elements.

The length of time the elements are available to be audited online is determined by contractual details with the broadcaster, and may include, for example, 60-90 days, although this is not intended as a limitation. Files older than that period can be archived in ways known in the art.

If the identifier code is the same for two elements, the content should be the same. The system 10 can also perform a waveform comparison of the audio data associated with these elements to ensure that this is indeed the case.

Another potential user is a network 24 of which the broadcaster is a member. Since the networks typically provide "must-carry" advertisements to their affiliated stations, these should be audited to ensure that the station is not pre-empting their mandated elements.

Another level of automation can be provided by permitting the system 10 to perform automatic audits for the network, for example, by comparing the scheduled network elements with actual broadcast elements. An alert could then be automatically sent to the network to alert them of the discrepancy. Another type of discrepancy could comprise one in a returned data file written to the specification of the network, so that an automatic update of their records could be effected.

The system 10 can also serve to instruct the encoder 11 to start and stop recording for capturing only a time of interest to a party, for example, for event-driven programming that are occasional events and not continual programs.

In a particular overall system 50 (FIG. 3) and method 100 (FIG. 4) in which the system 10 discussed above operates, playable events' instructions originate from the "programming sources" 51, such as a local station's traffic system 52, a first 53 and a second 54 network affiliation, and a local template or promotions output from a promotions suite 55. Incoming playlist modules (IPMs) 56 perform several functions, including flagging the origin of each element with a name for subsequent querying and reconciliation purposes. The IPMs 56 can also flag an availability for a network spot, which serves as a "reservation" for a certain amount of time.

The IPMs 56 channel the media for consolidation to a scheduling process, merging, and viewing software package 57 that places the programmed elements into "playback alignment" for final airplay, and consolidates the sources' output into a single playlist and then dispatches their portion of the playlist in the format needed to at least one of a plurality of playback systems 58. The dispersal of the playlist portion is achieved by means of outgoing playlist modules (OPMs) 59, which ensure correct preparation of playlist files for automation systems. The playback systems 58 to which the media are sent can comprise, for example, a primary 60 and a secondary 61 automation playback system; a sports, newsroom, or morning show automation playback system 62; Internet streaming 63; and HD radio programming 64.

The scheduling process, merging, and viewing software package 57 can also have other functions, such as, but not intended to be limited to, performing time alignment by recalculating airtime or start time of an event based upon a new lineup. Another function can include performing a "separation check" on product codes, advertiser names, or other field that contains data that need separation from others. This function prevents similar products from being scheduled in a conflicting manner.

The broadcast is monitored at the server 65 running the scheduling process, merging, and viewing software package 57, along the pathway labeled "automation inventory info." The server 65 comprises a schedule integration point, where various contributing playlists are assembled using processes to assemble the master playlist according to the station's programming objectives. "As-play" data can comprise a text file written in real time, preferably in read-only manner. Data are also sent that confirm a code, such as an ISCI code. These data can then serve as a reference to confirm that an event has been played, ensuring on-air accountability. The "as-scheduled" data are transmitted to the reconcile engine 30. "As-run" data are also channeled to the reconcile engine 30, and the reconciled findings are stored in a database and dispersed back to the originating sources 51, as well as reported to the user via an ad verify and client/buyer interface 66, as discussed above. In addition, a production control application 67, working with data supplied by a media check system, alerts production and continuity departments of production deadlines and copy to be dubbed.

Warnings can also be issued for certain exceptions, such as that a significant portion of airtime is not accounted for, an inordinate number of events have not been aired, and an inordinate number of moved events are present in the "as-play" data.

An exemplary method 100 (FIG. 4) for reconciliation operates as follows: Log information is read into the reconcile engine 30, as well as the "as-play" data, subject to whatever filters or restrictions have been imposed by the user (block 101). These data are then sorted based upon an identifier such as cart number and on date and time (block 102). The as-run data are scanned, and the filtered events are flagged as such (block 103), and are not included in the reconciliation. The scheduled events are then compared with the as-run list by looking through the program log for each reconcilable event and looking to the as-play data for the closest available event in time with the equivalent identifier (block 104). In this mode, the closest time value is sought; in another mode, the first occurrence of the event is sought (block 105), which is preferable for sports events, for which the timing of advertisements is typically highly variable. In yet another mode, when reliable data are made available from the playback system, an "original schedule time" is used to ascertain that the correct instances of the scheduled to aired events have been paired (block 106). For example, in order to confirm that the identifier came from a particular scheduled element, the data from the as-run file or entry is examined to ensure that the event in question indeed originated from a certain scheduled position.

Each event has now been flagged as "aired," "moved," "not aired", or "aired but not on the original log," this latter option referred to as "inserted" (see FIG. 2). The "inserted" event can have been added by the station in order to give a "bonus" to someone or to comply with a last-minute contract that necessitates events to be manually placed in the playback system playlist, circumventing the normal program log owing to its lateness. Any event that has not been reconciled is dropped (block 107), unless it had been flagged to avoid being reconciled, in which case the status is changed to "aired," with the schedule time becoming its air time (block 108). The system reviews the as-play data for any event that has not been accounted for by reconciliation to a scheduled event, and adds those data to the played file with whatever associated data are available (block 109).

The user, depending upon permission level, is then presented with the reconciled data (block 110), along with tools for performing further investigation, such as listening to the event (for example, by selecting "play" 70 on the screen of FIG. 2). The viewing screen can show all results or those that are problematic, and can sort by key values or search according to a user query. The user can toggle to the originally scheduled information and the raw as-play information for investigation as desired (block 111). The reconciliation process can also provide a report showing the duration of events that are scheduled but do not match, as well as titles of events that did play that do not match up with scheduled titles. The user can manually reconcile a played event with a scheduled event if a continuity error, identifier change, or copy change is detected (block 112). Changes made to the reconciliation should be auditable. The reconciliation data can be made available over the Internet 69 if desired, or via any other output device (block 113) as desired.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the operation and use of preferred embodiments thereof, and the advantageous new and useful results obtained thereby, the new and useful constructions, and reasonable equivalents thereof obvious to those skilled in the art, are set forth in the appended claims.

What is claimed is:

1. A computer-based method for status monitoring of broadcast events, the method comprising:

receiving as-scheduled information from a programming source, the as-scheduled information including identifying information and scheduled broadcast times for a first plurality of events scheduled to be broadcast;

receiving as-run information from a playback system, the as-run information being data outputted from the playback system distinct from a second plurality of broadcast events actually played by the playback system for broadcasting, the as-run information including identifying information and actual play times for the second plurality of events;

comparing the as-scheduled information and the as-run information to determine for each of the first plurality of events scheduled to be broadcast:

if the scheduled event was actually played, and if the scheduled event is determined to have actually played, the actual broadcast time associated therewith; and displaying the results of the comparison to a user for at least one of the first plurality of events scheduled to be broadcast.

2. The method recited in claim 1, further comprising, prior to displaying the results of the comparison to the user:

receiving a request from the user to view the results of the comparison; and determining whether the user is permitted to view the results.

3. The method recited in claim 1, wherein comparing the as-scheduled information and the as-run information includes accounting for a time delay imposed upon the broadcast.

4. The method recited in claim 1, wherein determining the actual broadcast time for each scheduled event determined to have actually broadcast includes scanning the as-run information for a first occurrence of the event.

5. The method recited in claim 1, wherein determining the actual broadcast time for each scheduled event determined to have actually broadcast includes scanning the as-run information for an occurrence of the event closest to the scheduled broadcast time.

6. The method recited in claim 1, wherein comparing the as-scheduled information and the as-run information is performed in real time.

7. The method recited in claim 1, further comprising recording an actual broadcast initiating from the playback system and associating time metadata therewith; and if the at least one event for which results of the comparison are displayed to a user is determined to have actually broadcast, allowing the user to play a segment of the recorded broadcast having time metadata corresponding to the actual broadcast time associated with the at least one event.

8. The method recited in claim 1, wherein comparing the as-scheduled information and the as-run information further includes:

if the event was actually broadcast, determining whether the actual broadcast time associated therewith falls within a predetermined range of the scheduled broadcast time associated therewith.

9. The method recited in claim 8, further comprising, if for any of the plurality of events scheduled to be broadcast, either the actual and scheduled broadcast times associated therewith are not within the predetermined range from the event scheduled time or the event is determined not to have actually broadcast, automatically sending an error indication to a sponsor of the event.

10. A system for status monitoring of broadcast events comprising:

a processor in communication with a programming source and a playback system; and a software package resident on the processor comprising code segments adapted for:

receiving as-scheduled information from the programming source, the as-scheduled information including identifying information and scheduled broadcast times for a first plurality of events scheduled to be broadcast;

receiving as-run information from the playback system, the as-run information being data outputted from the playback system distinct from a second plurality of broadcast events actually played by the playback system for broadcasting, the as-run information including identifying information and actual play times for the second plurality of events;

comparing the as-scheduled information and the as-run information to determine for each of the first plurality of events scheduled to be broadcast:

if the scheduled event was actually played , and if the scheduled event is determined to have actually played, the actual broadcast time associated therewith; and displaying the results of the comparison to a user for at least one of the first plurality of events scheduled to be broadcast.

11. The system recited in claim 10, wherein the software package further comprises code segments for, prior to displaying the results of the comparison to the user:

receiving a request from the user to view the results of the comparison; and determining whether the user is permitted to view the results.

12. The system recited in claim 10, wherein comparing the as-scheduled information and the as-run information includes accounting for a time delay imposed upon the broadcast.

13. The system recited in claim 10, wherein determining the actual broadcast time for each scheduled event determined to have actually broadcast includes scanning the as-run information for a first occurrence of the event.

14. The system recited in claim 10, wherein determining the actual broadcast time for each scheduled event determined to have actually broadcast includes scanning the as-run information for an occurrence of the event closest to the scheduled broadcast time.

15. The system recited in claim 10, wherein comparing the as-scheduled information and the as-run information is performed in real time.

16. The system recited in claim 10, further comprising an encoder for recording an actual broadcast initiating from the playback system and associating time metadata therewith;

wherein the software package further comprises code segments for:

if the at least one event for which results of the comparison are displayed to a user is determined to have actually broadcast, allowing the user to play a segment of the recorded broadcast received from the encoder having time metadata corresponding to the actual broadcast time associated with the at least one event.

17. The system recited in claim 10, wherein comparing the as-scheduled information and the as-run information further includes:

if the event was actually broadcast, determining whether the actual broadcast time associated therewith falls within a predetermined range of the scheduled broadcast time associated therewith.

18. The system recited in claim 17, wherein the software package further comprises code segments for, if for any of the plurality of events scheduled to be broadcast, either the actual and scheduled broadcast times associated therewith are not within the predetermined range from the event scheduled time or the event is determined not to have actually broadcast, automatically sending an error indication to a sponsor of the event.

19. A computer-based method for status monitoring of broadcast elements, the method comprising:

receiving as-scheduled information from a programming source, the as-scheduled information including identifying information and scheduled broadcast times for a first plurality of elements scheduled to be broadcast;

receiving as-run information from a playback system, the as-run information being data outputted from the playback system distinct from a second plurality of broadcast events actually played by the playback system for broadcasting, the as-run information including identifying information and actual play times for the second plurality of events;

recording an actual broadcast initiating from the playback system and associating time metadata therewith;

comparing the as-scheduled information and the as-run information in real time to determine for each of the first plurality of elements scheduled to be broadcast:

a) if the element was actually played, and b) if the element was actually played, the actual broadcast time associated therewith;

displaying the results of the comparison to a user for at least one of the first plurality of elements scheduled to be broadcast; and if the at least one element was determined to have actually played, allowing the user to play a segment of the recorded broadcast having time metadata corresponding to the actual broadcast time associated therewith.

* * * * *